No. 630,351.　　　　　　　　　　　　　　Patented Aug. 8, 1899.
T. R. HILBORN.
ADJUSTABLE PIG STALL AND TROUGH.
(Application filed Jan. 21, 1899.)
(No Model.)
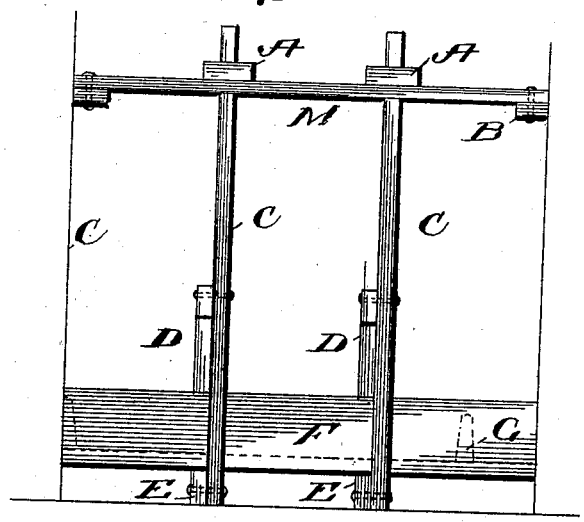
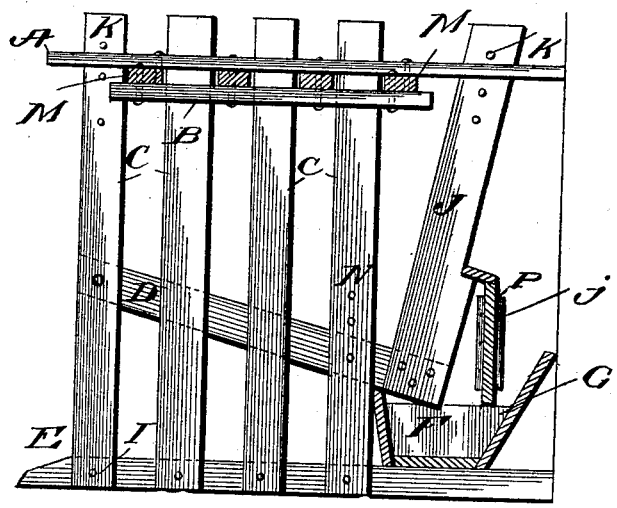
T. R. Hilborn, Inventor

UNITED STATES PATENT OFFICE.

TIMOTHY R. HILBORN, OF NEWMARKET, CANADA.

ADJUSTABLE PIG STALL AND TROUGH.

SPECIFICATION forming part of Letters Patent No. 630,351, dated August 8, 1899.

Application filed January 21, 1899. Serial No. 703,009. (No model.)

*To all whom it may concern:*

Be it known that I, TIMOTHY R. HILBORN, a subject of Her Majesty the Queen of England, residing at Newmarket, in the county of York and Province of Ontario, Dominion of Canada, have invented or discovered certain new and useful Improvements in Adjustable Pig Stalls and Troughs, (for which I have obtained a patent in the Dominion of Canada, No. 60,649, bearing date July 19, 1898;) and I do hereby declare the following to be a full, clear, and exact description of the invention or discovery, such as will enable others skilled in the art to which it appertains to make and use the same, reference being had to the accompanying drawings, forming a part of this specification.

My invention relates to improvements in adjustable pig-stalls; and the object of my improvements is to provide a stall which can be adjusted to any size or width, so as to suit the different sizes of hogs which may be in the pens. These stalls may be used in any form of pens. The trough in connection with the stalls is also adjustable, and by means of a sliding board only sufficient portion of the trough is exposed to permit the hog to feed without getting his feet and body into the trough.

A further object of my improvement is to provide a stall and trough that will prevent the hogs from crowding each other while feeding, that will keep them separate, and that will prevent a waste of food.

I attain the above objects by the construction illustrated in the accompanying drawings, in which—

Figure 1 is an end elevation of the stalls embodying my invention; and Fig. 2 is a side elevation of the said stalls, which elevation also shows a sectional end view of the feed-trough and cross-pieces of the frame.

Similar letters refer to similar parts throughout both views.

In the drawings, A represents a frame which is mortised to receive the partition-pieces C, C, and J. The pieces A A are bolted to the cross-pieces M M, which are in turn bolted to the auxiliary pieces B B, and thus the pieces A, M, and B, being bolted together, will form a top framework which can be raised or lowered, according to the size of the hogs, said frame to rest on iron pins K K and projecting shoulders in J. The piece D is rigidly connected to J and is pivotally connected at its rear end to the rear partition-pieces C C and forms a brace to strengthen the partition-pieces C C, and it can be raised or lowered at the junction with J, so as to rest on the trough, if required.

E represents the sill-pieces of the partition C C and are bolted to C C. The feed-trough F rests on blocks and is divided into different compartments by the division-pieces G.

I represents bolts which are used for fastening the different parts of the frame together. The partitions C C are adjustable to any desired width between them to suit large or small stock by sliding on the pieces M M, to which they are bolted. The spaces between the slats are to be about three inches or may be more for large stock.

The board P is a movable fall-board or cut-off fastened to the pieces J and mounted to slide between cleats or guide-strips *j*.

I thus provide an adjustable pig-stall which can be used in any form of pen for different sizes of hogs.

Having thus fully described my invention, what I claim as new, and desire to secure by Letters Patent, is—

The combination, with a feeding-trough having division-pieces G and the fall-board or cut-off P, of adjustable stalls comprising the adjustable vertical partition-pieces C rising from the sills E, the pieces D pivotally connected at their rear ends to the rear pieces C and adjustably connected near their front ends to the front division-pieces C, the pieces J secured to the front ends of the pieces D and carrying the fall-board or cut-off P, and a top framework composed of the frame-pieces A and M and vertically adjustable on said pieces C and J, substantially as and for the purpose described.

TIMOTHY R. HILBORN.

Witnesses:
 WILLIAM C. WIDDIFIELD,
 ISAAC SHUPE.